United States Patent [19]
Schultze et al.

[11] Patent Number: 5,908,690
[45] Date of Patent: Jun. 1, 1999

[54] NON-CRACKLING, ANTISTATIC POLYURETHANE FILM WITH HIGH BREATHABILITY AND ITS USE

[75] Inventors: Dirk Schultze, Fallingbostel; Nicole Hargarter, Schneverdingen; Hans-Werner Funk, Bomlitz; Reinhard Kunold, Walsrode, all of Germany

[73] Assignee: Wolff Walsrode AG, Walsrode, Germany

[21] Appl. No.: 08/718,031

[22] Filed: Sep. 23, 1996

Related U.S. Application Data

[63] Continuation of application No. 08/338,315, Nov. 14, 1994, abandoned.

[30] Foreign Application Priority Data

Nov. 19, 1993 [DE] Germany .............................. 43 39 475

[51] Int. Cl.⁶ .................................................. B32B 27/40
[52] U.S. Cl. ...................... 428/220; 428/423.1; 524/590; 525/460; 528/76
[58] Field of Search .............................. 528/76; 525/460; 428/220, 423.1; 524/590

[56] References Cited

U.S. PATENT DOCUMENTS

| | | | |
|---|---|---|---|
| Re. 31,671 | 9/1984 | Bonk et al. ................................ | 528/77 |
| 4,137,276 | 1/1979 | Sirota ....................................... | 525/459 |
| 4,190,711 | 2/1980 | Zdrahala et al. .......................... | 528/66 |
| 4,202,957 | 5/1980 | Bonk et al. ................................ | 528/77 |
| 4,367,237 | 1/1983 | Wakatsuka et al. ...................... | 424/275 |
| 4,371,684 | 2/1983 | Quiring et al. ........................... | 528/76 |
| 4,379,904 | 4/1983 | Ehrlich et al. ............................ | 528/77 |
| 4,942,214 | 7/1990 | Sakhpara .................................. | 528/59 |
| 5,047,456 | 9/1991 | Onwumere et al. ....................... | 524/13 |
| 5,246,996 | 9/1993 | McVie et al. ............................. | 525/453 |
| 5,397,824 | 3/1995 | Mcvie et al. ............................. | 525/453 |

FOREIGN PATENT DOCUMENTS

| | | |
|---|---|---|
| 052915 | 6/1982 | European Pat. Off. . |
| 1226071 | 10/1966 | Germany . |
| 4038705 | 6/1992 | Germany . |
| 9000180 | 1/1990 | WIPO . |

OTHER PUBLICATIONS

Derwent Abstract of JP 04–180,913 (1992).

*Primary Examiner*—Patricia A. Short
*Attorney, Agent, or Firm*—Sprung Kramer Schaefer & Briscoe

[57] ABSTRACT

A waterproof and, at the same time, breathable and antistatic film produced without a support by extrusion, the film having a DIN friction coefficient of less than 0.8 and consisting of thermoplastic polyurethane elastomer resins with a melt flow rate, as measured at 190° C. under a load of 10 kg, of at most 70, the soft segment of the elastomer resins consisting of polyethylene oxide and/or containing ethylene oxide reaction products and the relative percentage by weight of the soft segment in the polyurethane resin being between 35% by weight and 60% by weight, based on the total weight of the polyurethane used.

12 Claims, No Drawings

NON-CRACKLING, ANTISTATIC POLYURETHANE FILM WITH HIGH BREATHABILITY AND ITS USE

This application is a continuation of application Ser. No. 08/338,315, filed Nov. 14, 1994 now abandoned.

This invention relates to crackle-free, watertight, breathable and antistatic extruded films of thermoplastic polyurethanes which are characterized in that the film can be produced self-supportingly from the melt of the thermoplastic polyurethane, in that the thermoplastic polyurethane resin used has a softening range of $\geq 140°$ C. and in that the film may advantageously contain an antiblocking agent and/or a lubricant and has a surface resistance of $<10^{12}$ ohms.

The invention also relates to the use of these films for the sealing of porous sheet-form materials, such as woven fabrics and nonwovens, and utility articles made from them against microbes and their metabolism products, more particularly reducing and/or avoiding allergic effects.

The present invention also relates to the use of the films for the waterproofing of porous sheet-form materials, more particularly woven textiles and nonwovens, more particularly by lamination onto these materials.

It is already generally known that textiles, woven fabrics or similar porous sheet-form materials can be made impermeable to the penetration of water by sealing with a waterproof film or coating.

Permanently self-supporting films can be continuously produced from a solution or melt of a high molecular weight polymer resin. In addition, films can be produced by the reactive linkage of low molecular weight components, generally carried out on a support, as described in EP 0 282 771.

To ensure good wear behavior, climate-active or breathable materials are preferably used for sealing sheet-form textiles. However, the permeability of materials such as these to water vapor has to be extremely high to prevent the wearer of textiles thus treated from perspiring. The climate- or breathable character of a film is also normally demonstrated through its permeability to water vapor. High permeability to water vapor indicates good breathability whereas low permeability to water vapor indicates inadequate breathability.

In addition, it is known that microporous webs, for example of thin polytetrafluoroethylene films, which have been made microporous by biaxial stretching show high permeability to water vapor. Films such as these are described, for example, in U.S. Pat. No. 4,194,041. The disadvantages of web-form materials such as these apart from their lack of elasticity, i.e. their lack of resilience, include their poor mechanical stability and inadequate abrasion resistance. In addition, films such as these cannot be thermoplastically processed without undergoing a complete change in their property spectrum.

DE 40 38 705 describes polyurethane coating systems which are applied as reactive prepolymers to support materials and are crosslinked thereon. Sheet-form materials processed in this way have the disadvantage that they cannot be thermoformed any further after the film-forming process.

However, non-porous films with high breathability are required if the film has to show good mechanical properties in addition to high permeability. Non-porous films are also used with advantage for applications in medicine and hygiene to rule out any risk of contamination with, or transmission of, microorganisms or contaminants. The increasing occurrence of allergic reactions in the home, caused in particular by mites or their metabolism products, necessitates the sealing of textile webs against allergenic substances. The film systems coagulated from solution do not provide adequate protection against pores either.

Films also have to be non-porous and defect-free if they are to be back-foamed with a reactive polyurethane foam system and used either to prevent the penetration of foam or to seal prefabricated porous or perforated web-form materials. Non-porous films are preferably produced from the melt. As explained in EP 0 295 694, coating on support materials does not provide an adequate guarantee of non-porosity of the film. If impervious layers are to be produced by such a process, considerable layer thicknesses are required which in turn affects the breathability of the laminate. Accordingly, the film-forming resin should itself be convertible into a self-supporting film.

Processing from the melt is also of advantage because it is known from the relevant literature that, for the same material, processing from the melt leads to higher permeability to water vapor than processing from solution. This fact is illustrated, for example, by Komerska in: Journal of Plastic Film Sheeting (1987), 58–64.

Plastic films often have the disadvantage that they develop a static charge when rubbed against one another or against other materials. The subsequent discharge, which is perceived by the user as crackling or even as an electric shock, can affect the well-being of the user. Films such as these have to be antistatically treated. This is generally done by additives which can be removed from the surface of the film if they are found to be a disadvantage. Antistatic agents suitable for use in or on plastic films are described inter alia by Lehmann in: Kunststoffe 82 (1992), 991–992 and by Pfahler in: Gächter, Müller (Ed.), Kunststoff-Additive, 3rd Edition, Hanser Verlag, München (1989), page 779–805.

EP 0 111 360 describes films of thermoplastically processable copolyether elastomers which combine high breathability with impermeability to water. However, there are requirements in medicine and sanitary applications which these films are unable to satisfy. These include flexibility which they lack through the adjustment of their mechanical properties. However, if the films do show adequate strength, they are also comparatively stiff. If films such as these are made flexible and elastic with high resilience, their strength is inadequate for long-term self-supporting use.

In addition, it is known that these films tend to rustle and crackle when moved. The noise generated can seriously affect the well-being of the user. In addition, the raw materials available on the market are comparatively expensive. The same applies when a block copolyether amide is used instead of the copolyether ester in the production of the films.

Thermoplastically processable polyurethanes belong to the class of thermoplastic elastomers which generally encompasses copolymers of which the property spectrums are the result of combination of the respective properties of the individual components. Within this class of materials, block copolymers have acquired considerable significance. An informative overview of this class of materials is provided by Legge in: Rubber Chemistry and Technology 62 (1989) 529–547.

Despite their elastic character, the thermoplastic polyurethanes show both high mechanical strength and high chemical stability. The three basic components of thermoplastic polyurethanes are diisocyanates, short-chain diols (also known as chain extenders) and long-chain diols. Diisocyanates and chain extenders form the so-called hard segment which determines above all the strength of the thermoplastic polyurethane. The soft segment which bears the elastic component of the block copolymer is formed from the long-chain diols. The choice of the soft segment is important inter alia to the chemical stability of the thermoplastic polyurethane.

Among commercially available thermoplastic polyurethanes, a combination of good strength values, i.e. tensile strength and tear propagation resistance, with high elasticity, i.e. high extensibility and flexibility at low temperatures, is generally required. An overview of thermoplastic polyurethanes is provided by Goyert and Hespe in: Kunststoffe 68 (1978), 819–825 and by Hepburn (Ed.) in: Polyurethane Elastomers, Applied Science Publishers, Barking (1982), pages 49–80.

Hydrophilic polyurethane adhesive or coating systems permeable to water vapor are also known from the relevant specialist literature, cf. inter alia WO 90/00969 or DE 4 038 705. Unfortunately, these known systems are unsuitable for the formation of the required, self-supporting elastic films from the melt. Due to the application/processing technique, the adhesive systems do not satisfy the requirements of subsequent weldability or thermolaminatability. After application, they can no longer be subjected to a subsequent forming process. Polyurethane formulations of the type in question have surfaces with a high tendency to block. They are often optimized for good surface adhesion. Even the polyurethane resins described in WO 90/00180 or in Japanese patent J 03203-920 can only be produced and wound into rolls with a carrier film to prevent the films produced from blocking on the roll.

The coating systems have the disadvantage of a too low viscosity so that they are not suitable for the self-supporting production of films. Difficulties arise out of the inadequate viscosity of the melt which can be characterized by the melt flow rate( MFR). High MFR values indicate a marked tendency to flow while low MFR values indicate a high viscosity of the melt. The MFR values of the polyurethane resins in question are so high, i.e. the viscosity of the resins is so low due to relatively short molecular chains, that the molecular chains slide on one another and the melt film issuing from the die is not stabilized by entanglements of the molecular chains forming the polymer. The entanglement density increases with increasing molecular weight, i.e. with increasing chain length of the molecules forming the resin. The sliding of the chains on one another can also be prevented by systematic branches in the structure of the molecule. Unfortunately, branching also affects the softening and melting behavior so that its use in thermoplastic polyurethanes is generally undesirable. Materials with high MFR values can only be processed to films by coating on supporting webs.

In the leisure clothing field, elastic fabrics have recently been used to an increasing extent, providing the wearer with increased comfort, particularly during movement, by flexibly adapting themselves to anatomical features. Elastic fabrics are capable of undergoing considerable deformation so that they are also able flexibly to adapt themselves to the often anisotropic stresses caused by body movements without the textile material shifting or slipping. The fabrics in question are often produced using elastic polyurethane fibers. To facilitate dynamic adaptation to body movements, the film is required to react to external loads by elongation with only minimal effort. Since the films known from EP 0 111 360 for use in rainwear are unable reversibly to follow this elastic deformation on account of their stiffness or rather lack of strength, textiles for sportswear and leisure wear cannot be finished with waterproof and, in addition, elastic films.

For increased wearing comfort, it is also important that the film to be produced should not rustle or crackle in the event of movement and hence should not irritate the wearer or user by noise. In addition, the film should have a surface resistance which is so low that the film shows antistatic behavior or enables static electricity to be dissipated. According to Vanhaelen, the limit between antistatic behavior and the dissipation of static electricity is at $10^{12}$ (cf. World Plastic and Rubber Technology 1990, Cornhill Publications, London, pages 31–32).

Thermoplastic elastomers are known to have very smooth surfaces when processed from the melt. Such surfaces cause a high level of adhesive friction. This inhibition of surface slip, which is known as blocking, must be prevented to ensure good wear behavior.

Accordingly, the problem addressed by the present invention was to provide a non-crackling, elastic, waterproof and, at the same time, breathable film with high resistance to mechanical damage which, by virtue of its smooth surfaces, would be easy to clean and, at the same time, would show minimal surface roughness, thus enabling it to slide on a substrate without blocking. Its electrical surface resistance would not exceed $10^{12}$ ohms.

In the further development and improvement of existing film systems for applications in medical and/or sanitary applications and also for sealing elastic fabrics, a breathable film was to be provided which would be sufficiently elastic to adapt itself in particular to the deformations caused by body movements.

To ensure high impermeability to water and also to microorganisms and their metabolism products, a self-supporting film would have to be produced from the melt and and would not be coagulated from solution or coated on a support. In addition, the film would be able to be welded to itself after production so that impervious shaped parts could also be produced from it.

Another problem addressed by the invention was to provide a film formulation which would enable films to be produced more flexibly and to be more favorably priced through the use of less expensive raw materials.

Finally, the film would also have the advantage of being transparent or at least translucent so that the sealed material could be observed through the film.

These problems have been solved by a film of the type mentioned at the beginning which is characterized in that it is made up of linear, thermoplastically processable, segmented polyurethane molecules. These hydrophilic polyurethanes are formed from alternating blocks of soft and hard segments, the soft segments being formed from difunctional polyols A) which are formed by polymerization of ethylene oxide and/or which contain ethylene oxide and the hard segments being formed from the reaction products of a low molecular weight diol B), i.e. the chain extender, and a diisocyanate C). These blocks are attached to one another in such a way that the hard segment forms the two ends of the molecular chain and the reactive cyanate groups present at the ends of the linear molecule can be capped by alcohols D).

In a preferred embodiment, the soft segment A) is formed from difunctional compounds, i.e. compounds containing two terminal hydroxyl groups, ethylene oxide polymers and/or copolymers, which in many cases are also referred to as polyoxyethylene glycols and/or polyethylene oxide glycols, of which the monomer unit is characterized by the structure (—O—$CH_2$—$CH_2$—) and which have an average molecular weight of at least 400 g/mol and at most 2800 g/mol. In one particularly preferred embodiment, the average molecular weight is between 800 g/mol and 1200 g/mol. They are further characterized by a carbon-to-oxygen ratio by weight of at least 1.3 and at most 2.5. Based on the total weight of the thermoplastic polyurethane, the soft segment A) makes up from 35% to 60% and preferably from 40% to 50% of the weight of the thermoplastic elastomer which forms the film according to the invention. The tendency of the soft segment to crystallize can be reduced and breathability increased by copolymerizing the ethylene oxide with other cyclic ethers, for example propylene oxide or tetrahydrofuran.

The hard segment components may be selected from the isocyanate and diol components known for the production of film raw materials from thermoplastic polyurethanes.

The diol component B) may be selected from short-chain bifunctional types with molecular weights of 18 to 350 g/mol. Suitable dihydric alcohols are, for example, ethylene glycol, 1,2-propylene glycol, 1,4-butylene glycol (also known as tetramethylene glycol), 2,3-butylene glycol, pentane-1,5-diol, hexane-1,6-diol, octane-1,8-diol, also diethylene glycol, triethylene glycol, tetraethylene glycol and higher polyethylene glycols with a molecular weight of up to 350 g/mol, dipropylene glycol and higher polypropylene glycols with a molecular weight of up to 350 g/mol and dibutylene glycol and higher polybutylene glycols with a molecular weight of up to 350 g/mol.

Other low molecular weight diols B) with a molecular weight of up to 350 g/mol suitable for the production of the polyurethanes to be used in accordance with the invention are ester diols corresponding to the following general formula:

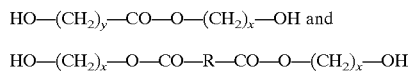

$$HO-(CH_2)_y-CO-O-(CH_2)_x-OH \text{ and}$$

$$HO-(CH_2)_x-O-CO-R-CO-O-(CH_2)_x-OH$$

in which
R is an alkylene group containing 1 to 10 carbon atoms and preferably 2 to 6 carbon atoms or a cycloalkylene or arylene group containing 6 to 10 carbon atoms,
x is a number of 2 to 6 and
y is a number of 3 to 5,
for example adipic acid bis-($\beta$-hydroxyethyl)-ester and terephthalic acid bis-($\beta$-hydroxyethyl)-ester.

Suitable isocyanates C) are aliphatic, cycloaliphatic, aromatic and heterocyclic diisocyanates corresponding to the following formula:

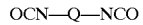

$$OCN-Q-NCO$$

in which
Q is an aliphatic hydrocarbon radical containing 2 to 18 and preferably 6 to 10 carbon atoms, a cycloaliphatic hydrocarbon radical containing 4 to 15 carbon atoms or an aromatic or partial aromatic hydrocarbon radical containing 6 to 15 and preferably 6 to 13 carbon atoms.

Examples of diisocyanates such as these are 1,4-tetramethylene diisocyanate, 1,6-hexamethylene diisocyanate, cyclohexane-1,3- and -1,4-diisocyanate and mixtures of these isomers, naphthylene-1,5-diisocyanate, 2,4- and 2,6-tolylene diisocyanate and mixtures of these isomers, diphenylmethane-2,4'- and/or -4,4'-diisocyanate.

Alcohols D) suitable as capping reagents are low molecular weight alcohols with a molecular weight of at least 32 g/mol and at most 100 g/mol. Both monohydric alcohols and di-, tri- or higher polyols are suitable as capping reagents. Aliphatic alcohols with a molecular weight of at least 32 g/mol and at most 400 g/mol are preferred.

According to the invention, preferred polyurethanes are those made up of
a) a polyether soft segment A) containing ethylene oxide reaction products and having an average molecular weight of at least 400 g/mol and at most 2800 g/mol and a carbon-to-oxygen ratio by weight of at least 1.3 and at most 2.5,
b) a chain extender or a mixture of chain extenders B) containing short-chain aliphatic diols with 2 to 6 carbon atoms as key constituents,
c) an aromatic diisocyanates with 15 carbon atoms in the molecule.

In one particularly preferred embodiment, the molar ratio of diisocyanate C) to chain extender B) is 1.3 to 1.8 and the molar ratio of diisocyanate C) to soft segment A) is between 3 and 4.

It is crucial to the production of monolayer, self-supporting, i.e. support-free, films that the molecular weight should be sufficient to guarantee withdrawal of the film from the melt. Where polyethylene oxide glycols are used, this calls for particular care in the cleaning and preliminary drying steps and in the prevention of moisture absorption after purification of the difunctional polyethylene oxide used for the synthesis of the polyurethane.

It is only the high viscosity of the melt which guarantees subsequent thermoformability of the film without the web-form melt tearing or developing holes. Weldability such as this is elementary for the film according to the invention because otherwise the absence of holes required could not be guaranteed. This web behavior is essential not only for impermeable welding, but also for thermoforming processes where the material is exposed to high temperatures.

It is not obvious to the expert that a polyurethane resin of the type in question could be processed to a self-supporting film which has a permeability to water vapor of at least 600 g/m$^2$-d, based on a 30 $\mu$m film, as measured in accordance with DIN 53 122 at 23° C./85% relative air humidity.

It was not obvious that this thermoplastic polyurethane resin would so readily lend itself to combination with additives that reduce blocking behavior so that the film shows good surface slip behavior as characterized by a DIN 53-378 friction coefficient of at most 0.8 (film-to-metal contact).

Suitable antiblocking agents are, for example, organic polymers incompatible with the film matrix and inorganic substances, such as silicates, silicon dioxide and calcium carbonate. Inorganic substances, more particularly natural or precipitated alumosilicates with an average particle size of 2 to 10 $\mu$m, have proved to be particularly suitable antiblocking agents. These anti-blocking agents are added in quantities of 1 to 7% by weight and preferably in quantities of 3 to 5% by weight, based on the average weight of the film.

In addition, such a film could not have been expected to show a surface resistance of at most 1012 ohms.

In addition, the thermoplastic polyurethane film according to the invention is readily deformable, as reflected in a low modulus at 50% elongation. The film also shows high resilience and minimal hysteresis. The absence of a supporting fabric provides for a sufficiently smooth surface which ensures that the film according to the invention can be effectively cleaned. The known tendency of thermoplastic polyurethanes towards blocking can be reduced or eliminated by the use of suitable antiblocking agents.

By virtue of the more favorable process control in the production of thermoplastically processable polyurethanes by polyaddition compared to the production of copolyether esters or block copolyether amides by polycondensation, the polyurethanes used in the film according to the invention can be produced far less expensively. Accordingly, the film produced in only one other processing step can be made available to a wider circle of users.

In addition, the film according to the invention has the advantage over copolyether esters or block copolyether amides that it does not crackle when subjected to folding and/or rubbing movements.

The thermoplastic polyurethane resin can be processed to films by cast film extrusion or blown film extrusion. These processes are described, for example, in Kirk-Othmer, Encyclopedia of Chemical Technology, Vol. 9 (1966), 232–241. These production processes enable films to be produced in thicknesses of a few micrometers to a few millimeters. Cast film extrusion has the advantage over blown film extrusion that films can be produced with improved thickness tolerances and in greater thicknesses.

Blown film extrusion is preferably used for the production of the film according to the invention. The price advantage of the thermoplastic polyurethanes is further improved by the more flexible processing behavior of these raw materials in production by comparison with copolyether esters or block polyether amides. By virtue of the slower formation of the domains from the isocyanate groups forming the hard segment, the inflation ratio of the blown film in blown film extrusion can be handled very flexibly so that, for a given die diameter, it is possible to produce a broader spectrum of film widths which in turn provides for inexpensive processing.

To improve performance properties, the films according to the invention can be provided with dyes and/or functional additives in the concentrations typically used for plastics. Preferred additives such as these are carboxylic acid amides, such as erucic acid amides, stearic acid amides and palmitic acid amides, or polydiorganosiloxanes or even fluororubbers and inorganic lubricants, such as molybdenum disulfide, and also salts of stearic acid. In addition, water-soluble polyethers or even natural triglycerides may be used as lubricants.

The permeability of the film according to the invention to water vapor may be further increased by addition of suitable additives which are compatible with the polyurethane resin forming the film according to the invention, for example organic phosphates. Additives for plastics are describes, for example, by Gächter/Müller in: Kunststoff-Additive, Carl Hanser Verlag, München, 3rd Edition (1989), pages 779–805.

To enable the films to retain their properties, they may contain stabilizers in effective quantities. The stabilizing additives in question are preferably photostabilizers and/or antioxidants and/or hydrolysis stabilizers.

Suitable photostabilizers are light-absorbing compounds, more particularly UV-absorbing benzoates and/or phenyl salicylates and also benzotriazoles. So-called quenchers, preferably nickel-organyl chelates and/or nickel dithiocarbamates, may also be used as photostabilizers.

The antioxidants used include so-called primary antioxidants, secondary amines sterically hindered by substitution at the nitrogen and/or hindered phenols and also secondary antioxidants, such as thioethers, phosphites or phosphonites, or synergistic mixtures of primary and secondary antioxidants.

Suitable hydrolysis stabilizers are carbodiimides, particularly in the form of non-extractable polycarbodiimides, and hydroxyethyl ureas.

The above-mentioned stabilizer systems for polyurethanes are described, for example, by a number of authors, including Graff, Leaversuch and Rogers in: Modern Plastics International 122 (1992), 9, pages 55–78.

The surface properties are established by any of the usual pretreatment techniques after cooling of the film and preferably before it is wound into roll form. Suitable pretreatment techniques include flame treatment, plasma treatment and, in particular, electrical corona pretreatment.

For electrical corona pretreatment, the film is best passed between two conductor elements serving as electrodes, such a high voltage (normally an a.c. voltage of around 10 kV with a frequency of 10 kHz) being applied between the electrodes that spray or corona discharges can take place. Under the effect of these discharges, air is ionized over the surface of the film, giving rise to reactions thereon in which more polar groups—compared with the polymer matrix—are formed. The electrical energy required is typically between about 10 and 20 $Wmin/M^2$. The treatment intensities required for the pretreatment of the films according to the invention are of the usual magnitude, treatment intensities producing a surface tension of 42 to 50 mN/m being preferred.

The invention is illustrated by the following Examples which are subsequently compared to one another in Table 1.

EXAMPLE 1

A thermoplastic polyurethane with a melt flow rate (MFR) of 67 g/10 min, as measured at 190° C. under a load of 10 kg, was prepared from the components diphenylmethane-4, 4'-diisocyanate, butane-1,4-diol and polyethylene oxide glycol with an average molecular weight of 800 g/mol. The percentages by weight of the components were 42% for the polyethylene oxide glycol, 47% for the diisocyanate and 11% for the butanediol. 3% by weight of a natural silica with particle sizes of 3 $\mu$m to 7 $\mu$m and 1% by weight of an amide wax (based on the total quantity of components used for producing the film) were added to the polyurethane.

The material was processed to film in a single-screw extruder with a flanged-on blown film die. Increasing temperatures of 150 to 180° C. were established in the 45 mm diameter extruder. The die temperature was 185° C.

EXAMPLE 2

A thermoplastic polyurethane with an MFR of 27 g/10 min, as measured at 190° C. under a load of 10 kg, was prepared from the components diphenylmethane-4,4'-diisocyanate, polyethylene oxide glycol with an average molecular weight of 100 g/mol and butane-1,4-diol. The percentages by weight of the components were 47.5% for the polyethylene oxide glycol, 42.5% for the diisocyanate and 10% for the butanediol.

A natural silica with particle sizes of 3 $\mu$m to 7 $\mu$m was added to the polymer in a quantity of 5% by weight, based on the total weight of the components used to produce the film.

Processing to film was carried out under the same conditions as in Example 1.

EXAMPLE 3

A thermoplastic polyurethane with an MFR of 30 g/10 min, as measured at 190° C. under a load of 10 kg, was prepared from the components diphenylmethane-4,4-diisocyanate, butane-1,4-diol and polyethylene oxide glycol with an average molecular weight of 900 g/mol. Triethylene glycol was used to cap the terminal groups. The percentages by weight of the components were 45% for the polyethylene oxide glycol, 44% for the diisocyanate, 10% for the butanediol and 1% for the capping reagent.

5% by weight of a synthetic silica with particle sizes of 4 μm to 6 μm and 2% by weight of an amide wax (based on the total quantity of components used to produce the film) were added to the polymer. Processing to film was carried out as in Example 1.

COMPARISON EXAMPLE 1

A commercially available thermoplastic polyurethane with an MFR of 17 g/10 min, as measured at 190° C. under a test load of 10 kg, synthesized from the components dimethylmethane-4,4'-diisocyanate, butane-1,4-diol and polybutylene adipate and characterized by a Shore A hardness of 90, was processed to film with additions of 7% by weight of a natural silica with particle sizes of 3 μm to 7 μm and 2% by weight of an amide wax. The die described in Example 1 was used.

COMPARISON EXAMPLE 2

A thermoplastic polyurethane was produced as described as in Example 1. However, processing to film was carried out without the additions of silica and amide wax.

TABLE 1

|  | Unit | Example 1 | Example 2 | Example 3 | Comparison Example 1 | Comparison Example 2 |
|---|---|---|---|---|---|---|
| Film thickness | μm | 50 | 20 | 40 | 40 | 40 |
| Electrical surface resistance | Ohm | $3 \cdot 10^{11}$ | $6 \cdot 10^{10}$ | $5 \cdot 10^{11}$ | $1.3 \cdot 10^{13}$ | $5 \cdot 10^{10}$ |
| Permeability to water vapor | g/(m²24 h) | 438 | 1120 | 635 | 95 | 591 |
| Tensile strength | N/mm² | 29.1 | 25.0 | 32.5 | 64.8 | 30.3 |
| Breaking elongation | % | 461 | 339 | 518 | 452 | 631 |
| Modulus at 50% elongation | N/mm² | 5.7 | 5.0 | 5.3 | 7.9 | 5.6 |
| Tear propagation resistance | N/mm | 61.6 | 49.3 | 65.1 | 78.2 | 67.6 |
| Friction coefficient |  | 0.59 | 0.7 | 0.65 | 0.44 | <1 |

It can be seen from Table 1 that the films according to the invention are superior in terms of the required property profile to the films of known raw materials for the production of thermoplastic urethane films. Permeability to water vapor was distinctly increased in relation to the comparison film. By virtue of their antistatic character, they prevent the sudden discharge of static electrical charges built up, for example, by friction. The low modulus at 50% elongation underscores the ability of the film according to the invention to adapt themselves readily to external stresses. The addition of organic and inorganic additives in accordance with the invention enables non-blocking surface slip behavior to be established.

Determination of Permeability to Water Vapor

Permeability to water vapor was determined in accordance with DIN 53 122 at a temperature of 23° C. and 85% relative air humidity.

Determination of Tear Propagation Resistance

Tear propagation resistance was determined in accordance with DIN 53 515. The test specimens used were angled specimens with an incision corresponding to the ISO 34, method B. The test specimens were removed at an angle of 90° relative to the machine direction of the film web.

Determination of Tensile Strength, Breaking Elongation and Modulus at 50% Elongation Tensile strength, breaking elongation and modulus at 50% elongation were determined in accordance with DIN 53 455. Test strips with a length between clamps of 100 mm were used. The test specimens were removed at an angle of 90° relative to the machine direction of the film web.

Determination of Friction Coefficient

The dimensionless friction coefficient was determined in accordance with DIN 53 375 using metal-to-film contact.

Determination of Electrical Surface Resistance

The electrical surface resistance was determined in accordance with DIN 53 482, electrode arrangement A. The test was carried out with a test voltage of 500 V.

Determination of Melt Flow Rate

The melt flow rate (MFR) was measured in accordance with ISO 1135, method A, at a temperature of 190° C. and a load of 10 kg.

What is claimed is:

1. A watertight and, at the same time, breathable and antistatic film produced without a support by extrusion, wherein the film has a DIN friction coefficient determined according to DIN 53 375, of less than 0.8 and is formed from hard-segment-terminated thermoplastic polyurethane elastomer resins with a melt flow index, as measured at 190° C. under a load of 10 kg, of at most 70 g/min, determined according to ISO 1133, the soft-segment of the elastomer resins consisting of polyethylene oxide and/or containing ethylene oxide reaction products and the relative percentage by weight of the soft-segment in the polyurethane resin being between 35% by weight and 60% by weight, based on the total weight of the polyurethane used, and wherein the synthesis of said thermoplastic polyurethane elastomer comprises the steps of first reacting a polyether soft-segment, chain extender and aromatic diisocyanate, and then adding a capping alcohol.

2. A film as claimed in claim 1, characterized in that the polyurethane elastomer resin has a melt flow index, as measured at 190° C. under a load of 10 kg, of at most 40 g/10 min, determined according to ISO 1133.

3. A film as claimed in claim 1, characterized in that the relative percentage by weight of the ethylene oxide soft segment in the polyurethane resin formed is at least 40% by weight and at most 50% by weight, based on the total weight of the polyurethane used.

4. A film as claimed in claim 1, characterized in that the film is additionally provided with at least 0.3% by weight and at most 1% by weight of lubricants and waxes, based on the total weight of the mixture as a whole.

5. A film as claimed in claim 3, characterized in that the film has a thickness of 15 μm to 100 μm.

6. An antistatic membrane film with a selective barrier effect against liquid and/or solid media combined with high permeability to water vapor and an ability to dissipate static electrical charges, comprised of the film of claim 1.

7. A breathable covering film for sheet-form textiles comprised of the film of claim 1.

8. A waterproof textile comprising the film of claim 1.

9. A breathable covering film for porous sheet-form materials comprised of the film of claim 1.

10. A method of sealing mattresses against mites, bacteria and other microorganisms and/or their metabolism products which comprises sealing said mattresses with a film according to claim 1.

11. The film of claim 1, wherein said polyurethanes comprise a) a polyether soft segment A) containing ethylene oxide reaction products and having an average molecular weight of at least 400 g/mol and at most 2800 g/mol and a carbon-to-oxygen ratio by weight of at least 1.3 and at most 2.5, b) a chain extender or a mixture of chain extenders B) containing short-chain aliphatic diols with 2 to 6 carbon atoms as key constituents, and c) an aromatic diisocyanate with 15 carbon atoms in the molecule.

12. A film according to claim 1, wherein a capping alcohol component is added as the last component in the synthesis.

* * * * *